United States Patent [19]
Yun

[11] Patent Number: 5,854,696
[45] Date of Patent: Dec. 29, 1998

[54] SINGLE MOTOR DRIVING DEVICE OF A FACSIMILE SYSTEM

[75] Inventor: Young-Jung Yun, Kyungki-do, Rep. of Korea

[73] Assignee: SamSung Electronics Co., Ltd., Suwon, Rep. of Korea

[21] Appl. No.: 730,052

[22] Filed: Oct. 15, 1996

[30] Foreign Application Priority Data

Oct. 12, 1995 [KR] Rep. of Korea ............... 28546/1995

[51] Int. Cl.⁶ ............................... H04N 1/04; H04N 1/36
[52] U.S. Cl. ..................... 358/498; 358/496; 358/412; 271/9.01; 271/10.04; 271/10.09
[58] Field of Search ................... 358/498, 496, 358/494, 412, 413, 414, 401, 400, 501, 500, 296, 304; 271/9.01, 114, 10.04, 126, 9.13, 127, 110, 10.09; 399/385; 318/280; 400/621, 624, 625, 605, 185, 187, 120.16, 314, 320, 323, 547.3, 551, 577; 347/215, 3, 104, 197, 220

[56] References Cited

U.S. PATENT DOCUMENTS

| | | | |
|---|---|---|---|
| 4,280,145 | 7/1981 | Norrell | 358/489 |
| 4,444,521 | 4/1984 | Richard et al. | 400/120.16 |
| 4,743,975 | 5/1988 | Ijuin | 358/404 |
| 4,752,786 | 6/1988 | Inoue et al. | 346/139 R |
| 5,097,187 | 3/1992 | Koshiishi et al. | 318/280 |
| 5,150,630 | 9/1992 | Kida et al. | 74/354 |
| 5,206,737 | 4/1993 | Sugiyama | 358/296 |
| 5,213,426 | 5/1993 | Ewing | 400/624 |
| 5,226,639 | 7/1993 | Kida et al. | 271/109 |
| 5,369,509 | 11/1994 | Ko | 358/498 |
| 5,391,009 | 2/1995 | Stodder | 400/605 |
| 5,412,407 | 5/1995 | Okubo et al. | 347/215 |
| 5,419,543 | 5/1995 | Nakamura et al. | 271/9.01 |
| 5,523,858 | 6/1996 | Yamada et al. | 358/498 |
| 5,552,902 | 9/1996 | Kohno | 358/498 |
| 5,564,842 | 10/1996 | Kida et al. | 400/185 |
| 5,663,804 | 9/1997 | Kataoka et al. | 358/304 |
| 5,671,065 | 9/1997 | Lee | 358/304 |

Primary Examiner—Kim Yen Vu
Assistant Examiner—Cheukfan Lee
Attorney, Agent, or Firm—Robert E. Bushnell, Esq.

[57] ABSTRACT

A single motor driving device usable in a facsimile system which uses a single motor to drive operation in one of a transmission mode, a reception mode, a copying mode, and a reception back mode. The single motor driving device may be constructed with a drive gear rotating through a driving force of a step motor; a first gear engaging with one side of the drive gear; a center gear engaging with one side of the first gear; a first reciprocating gear engaging with the center gear, the center gear and first reciprocating gear being pivotally connected to each other by a first link; a second gear installed to one side of the first reciprocating gear; a cam gear for changing a position of a lever which is installed to an upper portion of thereof, which is installed to the other side of the first reciprocating gear, provided with a cam for controlling the first link, a lever cam for controlling the lever, and a sensor cam for controlling a sensor at one surface thereof; the sensor for setting a position of a transmission, copy, reception and reception back of the cam gear provided the other surface of the cam gear; and a second reciprocating gear engaging with the other side of the center gear, the center gear and the second reciprocating gear being pivotally connected to each other by the second link.

32 Claims, 11 Drawing Sheets

5,854,696

SINGLE MOTOR DRIVING DEVICE OF A FACSIMILE SYSTEM

CROSS REFERENCE TO RELATED APPLICATION

This application makes reference to, incorporates the same herein, and claims all benefits accruing under 35 U.S.C. §119 from an application for A *Single Motor Driving Device Of A Facsimile System* earlier filed in the Korean Industrial Property Office on 12 Oct. 1995, and there duly assigned Ser. No. 28546/1995.

BACKGROUND OF THE INVENTION

1. Technical Field

The present invention relates to a facsimile system, and more particularly to a single motor driving device in a facsimile system for operation in one of a transmission, reception, reception back and copying modes using a single motor.

2. Background Art

Conventionally, facsimile system generally operates in three modes: transmission, reception, and copying modes. In the transmission mode, an original document is read and the read image data is transmitted to a destination. In the reception mode, the image data sent from another communication system is recorded on a recording medium. In the copying mode, an original document is read and is recorded directly. Each facsimile system typically contains a signal transmission section and a signal reception section as disclosed, for example, in U.S. Pat. No. 4,646,162 for *Driving Device For Facsimile Apparatus* issued to Sue. The signal transmission section includes feed rollers for feeding a number of documents one by one to a predetermined station inside the system, transfer rollers for transferring the documents fed by the feed rollers, pressure rollers for closely contacting the surfaces of the documents with an image sensor for scanning the information recorded on the documents and a transmission motor for driving all rollers to permit reading and transmission of the original document. The signal reception section includes transfer rollers for transferring a recording medium such as paper, a recording head for recording received data information on the recording medium, discharge rollers for discharging the recording medium and a reception motor for driving all rollers to permit reception and recording images on a recording medium. In the copying mode, both the transmission and reception motors are necessarily driven to read the original document and record the same directly on the recording medium.

However, with a recent trend for smaller and less expensive facsimile systems, the requirement of at least two motors to operate in the transmission, reception and copying modes is undesirable and the use of a single motor has been implemented to eliminate the necessity for two separate motors as invariably disclosed, for example, in U.S. Pat. No. 4,743,975 for *Image Processing Apparatus* issued to Ijuin, U.S. Pat. No. 4,866,531 for *Recording Medium Feeding Apparatus* issued to Kobori et al., U.S. Pat. No. 5,157,521 for *Both Surface Transmitting Facsimile Utilizing One CIS* issued to Chung, U.S. Pat. No. 5,206,737 for *Facsimile Apparatus Using A Single Bi-Directional Motor To Control Feeding Of An Original Document And A Recording Paper With Selection Between Plural Modes Of Operation* issued to Sugiyama, and U.S. Pat. No. 5,369,509 for *Document Transferring System For A Facsimile Apparatus* issued to Ko, and assigned to the same assignee of the present invention.

Generally, facsimile systems use a single motor to perform all three operation modes. The motor used in this technique has a rotating shaft that is rotatable in a forward direction and a reverse direction. In the reception mode, the motor is rotated in one direction. This rotation is transmitted to a record roller via a first one-way clutch to allow the record roller to feed a recording paper into the facsimile system for image reception. In the transmission mode, the motor is rotated in an opposite direction. This rotation is transmitted to a white roller via a second one-way clutch. Switch means is driven by a solenoid to transmit the rotation to a read roller. The read roller then feeds an original with an image into the facsimile system for image transmission. In the copying mode, the motor is rotated in one direction, and the rotation is transmitted to the read roller via the first one-way clutch. Since the switch means is operated in the copy operation mode, the rotation in one direction is transmitted to the read roller so that both the record roller and the read roller are rotated simultaneously to feed the original and recording paper.

In such a conventional facsimile system, transmission, reception, and copying can all be performed with a single motor. However, rotation must be controlled by the solenoid and the solenoid is fairly costly to install along with a complex mechanical arrangement necessary to drive different rollers in the facsimile system. For this reason, production cost remains relatively high. Moreover, installation of the solenoid along with its mechanical arrangement requires undesirable large space which can compromise the compactness and low cost based facsimile system. Further, when the size and weight of the facsimile system are large, design options of the system are limited.

SUMMARY OF THE INVENTION

Accordingly, it is an object of the present invention to provide an improved facsimile system using a new single motor structure.

It is also an object to provide an improved single motor structure and process for document transfer in a facsimile system that eliminates the necessity for a solenoid for operation.

It is another object to provide an improved single motor structure and process for document transfer in a facsimile system that is more compact and requires fewer mechanical components so as to minimize production cost and to reduce an assembly process.

These and other objects of the present invention can be achieved by a single motor driving device usable in a facsimile system that may be implemented with a motor rotatable in one of a first direction and a second direction; a drive gear directly connected to said motor to rotate in one of the first direction and the second direction in response to a driving force of the motor; a first gear rotatably engaged with the drive gear; a center gear rotatably engaged with the first gear; a first reciprocating gear pivotally connected to the center gear via a first link; a second gear disposed adjacent to the first reciprocating gear, for transferring rotational power from the first reciprocating gear when the first reciprocating gear is engaged with the second gear; a third gear rotatably engaged with the second gear; an automatic feed roller gear rotatably engaged with the third gear; a first idler gear rotatably engaged with the automatic feed roller gear; a second idler gear rotatably engaged with the first idler gear; and a transmission roller gear rotatably engaged with the second idler gear, for transferring rotational power from the second idler gear to drive a transmission roller coaxially mounted thereon to feed an original document into the facsimile system. A second reciprocating gear is pivotally connected to said center gear via a second link. Fourth and fifth gears are interlocked and disposed adjacent to the second reciprocating gear, for transferring rotational power from the second reciprocating gear when the second reciprocating gear is engaged with one of the fourth and said fifth gear. A sixth gear is rotatably engaged with the fifth gear, for transferring rotational power from the fifth gear to drive a reception roller gear having a reception roller coaxially mounted thereon to feed a recording paper into the facsimile system. A lever is positioned to regulate movement of the second link. A cam gear is then disposed adjacent to the first reciprocating gear, for controlling movement of the first link and movement of the second link via the lever to begin operation of one of a transmission mode, a reception mode, a copying mode and a reception back mode.

The present invention is more specifically described in the following paragraphs by reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENT

Figure 1:
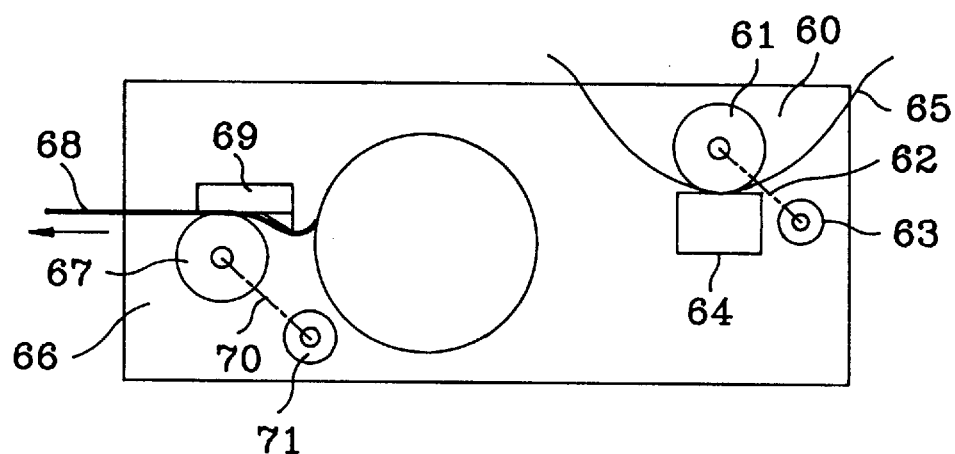
FIG. 1 illustrates a conventional facsimile system using a transmission driving unit and a reception driving unit having separate motors for performing communication of image data.
Figure 2:
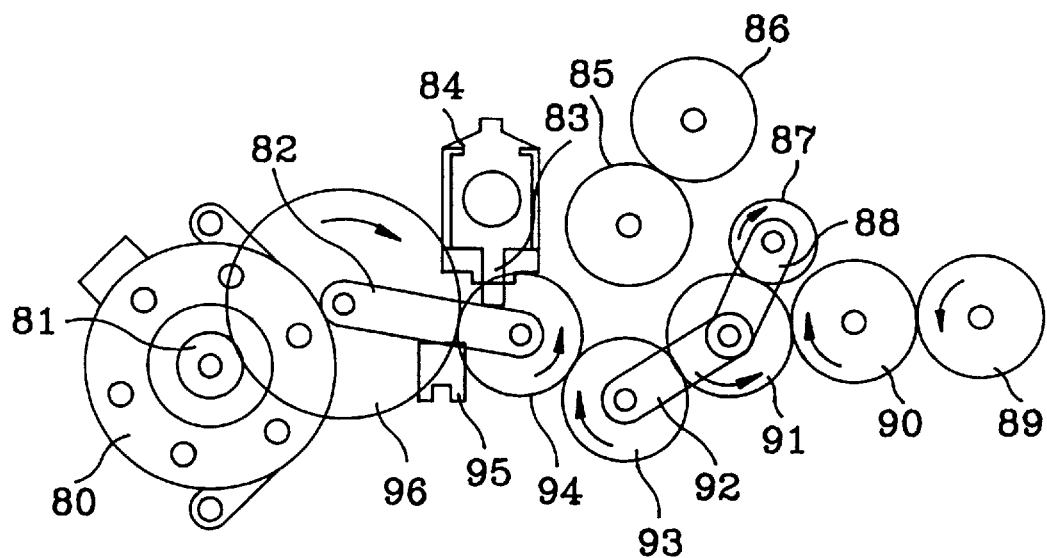
FIG. 2 illustrates a typical single motor driving device usable in a recent facsimile system which operates in a transmission mode.

Referring now to the drawings and particularly to FIG. 1, which illustrates a conventional facsimile system having a separate transmission driving unit 60 and a reception driving unit 66 for performing communication of image data. As shown in FIG. 1, the transmission driving unit 60 includes a first roller 61, a transmission motor 63 which is connected to the first roller 61 by a train of gearing 62 and an image sensor 64 which is provided to be in contact with the first roller 61. As an original document 65 to be transmitted passes between the first roller 61 rotated by the transmission motor 63 and the image sensor 64 upon operation of a transmission mode, an image contained in the document is transmitted to a remote communication system. The reception driving unit 66 includes a second roller 67, a reception motor 71 which is connected to the second roller 67 by a train of gearing 70 and a recording head 69 which is provided to be in contact with the second roller 67. As a recording paper 68 passes between the second roller 67 and the recording head 69 upon operation of a reception mode, a received image is printed on the recording paper 68.

In such a conventional facsimile system, two motors are required for performing the transmission, reception and copying functions. More specifically, a transmission motor 63 is used for reading an original for transmission, and a reception motor 71 is used for recording images on a recording paper. In the copying mode, both the transmission and reception motors are driven. The requirement of two separate motors unfortunately necessitates a higher production cost and an undesirably increase in size and weight of the facsimile system.

FIGS. 2 to 5 illustrate a recent facsimile system using a typical single motor driving device which seeks to eliminate the necessity for two separate motors but requires the use of a fairly costly solenoid for driving the mechanical arrangement to operate in the transmission, reception and copying modes. More specifically, FIGS. 2 to 5 illustrate a typical single motor driving device usable in a recent facsimile system in each of a transmission mode, a reception mode, a copying mode, and a reception back mode.

The single motor driving device usable in the recent facsimile system includes a single main motor 80, a drive gear 81 which is directly connected to the main motor 80 to rotate through the driving force of the main motor 80 and a first gear 81 which is engaged with the drive gear 80 at one side. The first gear 96 also engages with a first reciprocating gear 94 at another side thereof, and both the first gear 96 and the first reciprocating gear 94 are pivotally connected to each other by a first link 82. A sensor 95 is provided at a lower portion of the first link 82 for sensing a position of the first reciprocating gear 94. A solenoid 84 is provided at an upper portion of the first link 82 between the first gear 96 and the first reciprocating gear 94. The solenoid 84 is driven to drive a push lever 83 to push toward the first link 82 so that the first gear 96 may be engaged with the first reciprocating gear 94. The first reciprocating gear 94 engages with a first swing gear 93 at one side, and the first swing gear 93, in turn, engages with a second swing gear 91 at another side. The first and second swing gears 93 and 91 are pivotally connected to each other by a second link 92. The second swing gear 91 engages with the second reciprocating gear 87 at one side thereof, and the second swing gear 91 and the second reciprocating gear 87 are pivotally connected to each other by a third link 88. The second swing gear 91 engages with a second gear 90 at the other side thereof, and the second gear 90 engages with a transmission roller gear 89 for transferring the document at one side thereof. The first reciprocating gear 94 engages with a third gear 85 at an upper side thereof, and the third gear 85 engages with a reception roller gear 86 for transferring a recording paper at one side thereof Referring to FIG. 2 which illustrates the typical single motor driving device using a solenoid in a facsimile system operable in a transmission mode. Upon a transmission mode, the drive gear 81 rotates in response to a driving force of the main motor 80 in a counterclockwise CCW direction. The first gear 96 which is engaged with the drive gear 81 rotates in a clockwise direction, and the first reciprocating gear 94 rotates in a counterclockwise direction in response to surface pressure of the first gear 96. At this time, the sensor 95 controls the first reciprocating gear 94 to engage with the first swing gear 93. After that, the first swing gear 93 rotates in a clockwise direction in response to rotation of the first reciprocating gear 94, and the second swing gear 91 engages with the second gear 90 while rotating in a clockwise direction in response to rotation of the first swing gear 93 and along with this, rotates in a counterclockwise direction. The second gear 90 rotates in a clockwise direction which, in turn, allows the transmission roller gear 89 to rotate in a counterclockwise direction. When rotating in a counterclockwise direction, the transmission roller gear 89 allows a transmission roller to transfer an original document into the facsimile system for an image transmission.

Figure 3:
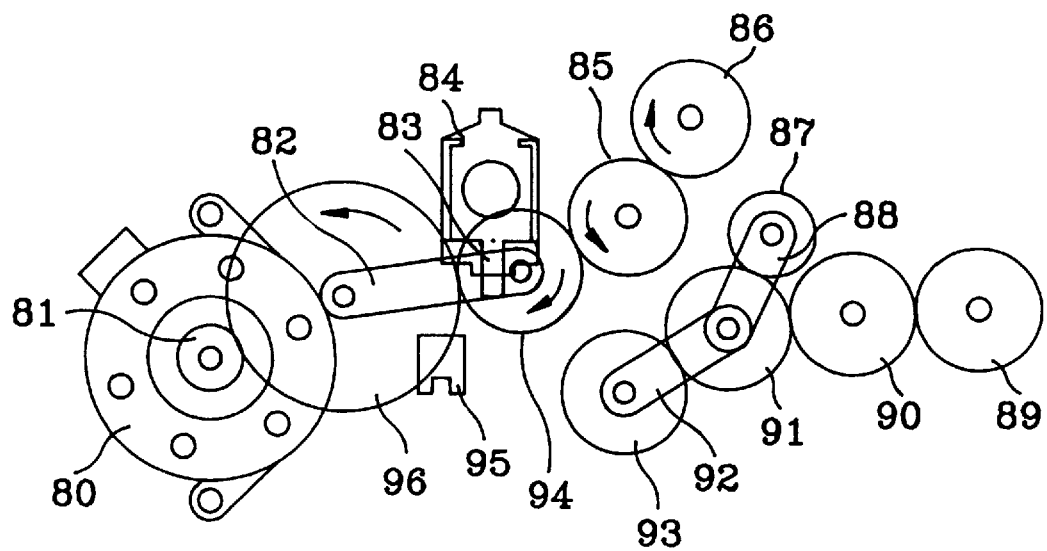
FIG. 3 illustrates the same single motor driving device usable in the recent facsimile system which operates in a reception mode.

FIG. 3 illustrates an operation of the typical single motor driving device using a solenoid in a facsimile system operable in a reception mode. Upon a reception mode, the drive gear 81 rotates in a clockwise direction in response to a driving force of the main motor 80 after the push lever 83 is pushed upward by the drive (ON/OFF) of the solenoid 84. The first gear 96 then rotates in a counterclockwise direction in response to rotation of the first gear 96, and the first reciprocating gear 94 rotates in a counterclockwise direction in response to the surface pressure of the first gear 96. The third gear 85 which is engaged with the first reciprocating gear 94 rotates in a counterclockwise direction in response to rotation of the first reciprocating gear 94. When the third gear 85 rotates in a counterclockwise direction, a reception roller gear 86 rotates in a clockwise direction to allow a reception roller to transfer a recording paper into the facsimile system for an image reception.

Figure 4:
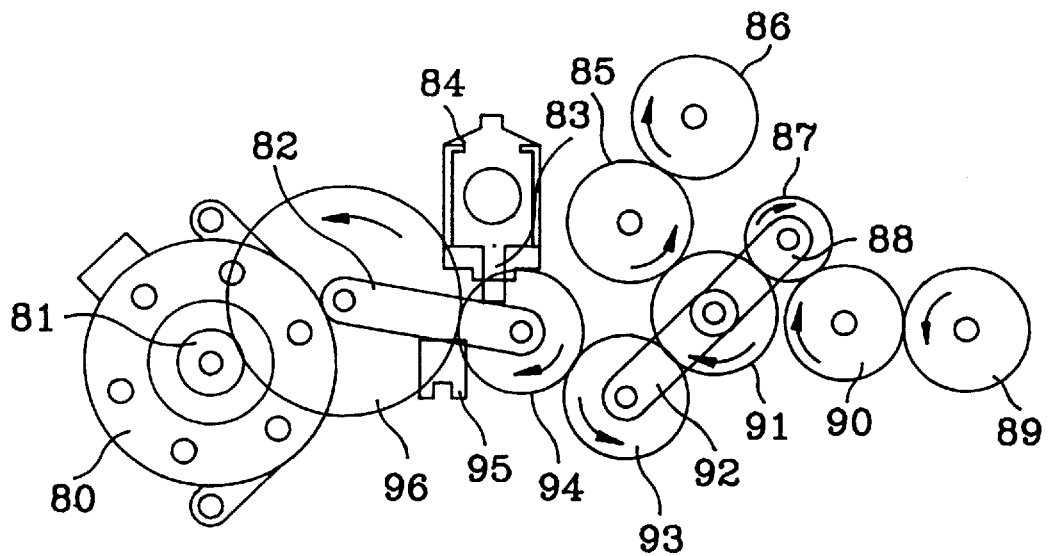
FIG. 4 illustrates the same single motor driving device usable in the recent facsimile system which operates in a copying mode.

FIG. 4 illustrates an operation of the typical single motor driving device using a solenoid in a facsimile system operable in a copying mode. The drive gear 81 first rotates in a counterclockwise direction in response to the driving force of the main motor 80. The first gear 96 then rotates in a clockwise direction in response to rotation of the drive gear 81. The first reciprocating gear 94 rotates in a clockwise direction by the surface pressure with the first gear 96 to thereby engage with the first swing gear 93. At this time, if the drive gear 81 rotates in a counterclockwise direction, the first reciprocating gear 94 is set to rotate in a counterclockwise direction, but is deterred from such rotation by the push lever 83 of the solenoid 84 and the first link 82. As a result, the first reciprocating gear 94 rotates in a clockwise direction while engaging with the first swing gear 93. The first swing gear 93 then rotates in a counterclockwise direction in response to rotation of the first reciprocating gear 94. The second swing gear 91 which is engaged with the first swing gear 93 rotates in a clockwise direction which, in turn, allows the third gear 85 to rotate in a counterclockwise direction. When the third gear 85 rotates in a counterclockwise direction, a reception roller gear 86 rotates in a clockwise direction to allow a reception roller to transfer a recording paper into the facsimile system. At this time, the second reciprocating gear 87 rotates in a clockwise direction by the third link 88 to thereby engage with the second gear 90 and along with this, rotates in a counterclockwise direction. The second gear 90 then rotates in a clockwise direction in response to rotation of the second reciprocating gear 87. The transmission roller gear 89 which is engaged with the second gear 90 rotates in a counterclockwise direction in response to rotation of the second gear 90 to allow a transmission roller to turn and transfer the original document into the facsimile system for completion of a copying operation.

Figure 5:
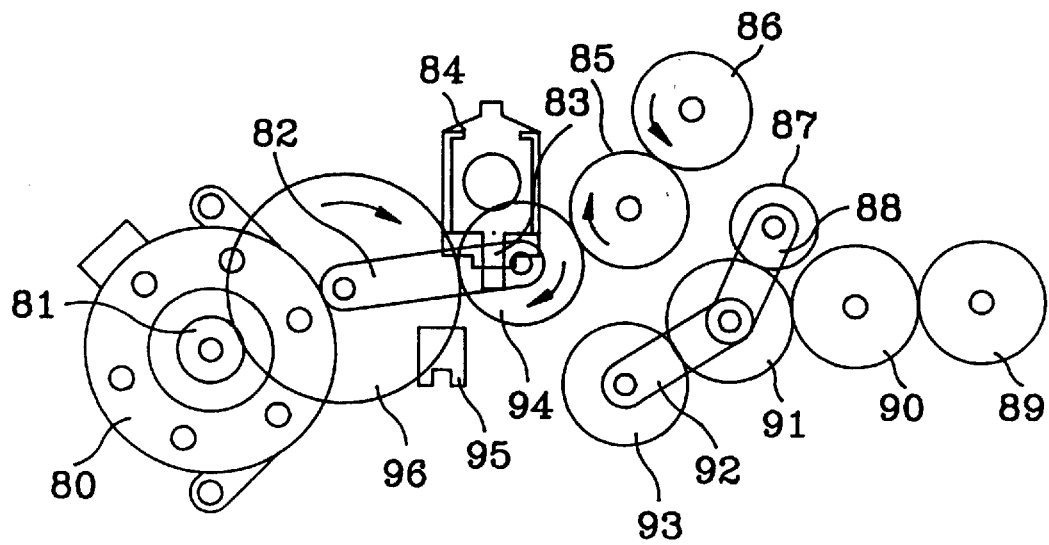
FIG. 5 illustrates the same single motor driving device usable in the recent facsimile system which operates in a reception back mode.

Referring to FIG. 5 which illustrates an operation of the typical single motor driving device using a solenoid in a facsimile system operable in a reception back mode. When the drive gear 81 rotates in a clockwise direction in response to the driving force of the main motor 81 after the lever 83 is pushed upward by the drive (ON/OFF) of the solenoid 84, the first gear 96 rotates in a counterclockwise direction by the drive gear 81. The first reciprocating gear 94 then rotates in a counterclockwise direction by the surface pressure with the first gear 96 to thereby engage with the third gear 85. When the drive gear 81 rotates in a counterclockwise direction, the first reciprocating gear 94 is deterred by the push lever 83 of the solenoid 84 and the first link 82 from rotating in a clockwise direction. As a result, the first reciprocating gear 94 rotates in a counterclockwise direction while engaging with the third gear 85. After that, the third gear 85 rotates in a clockwise direction by the reciprocating gear 94, the reception roller gear 86 rotates in a counterclockwise direction by the third gear 85 and along with this, allows a reception roller to rotate in an opposite direction of a reception direction so as to transfer the recording paper into the facsimile system for completion of a reception back operation.

In a facsimile system having such a motor driving device, transmission, reception, and copying can all be performed with a single motor. However, rotation must be controlled by the solenoid and the solenoid is fairly costly to install along with a complex mechanical arrangement necessary to drive different rollers in the facsimile system. For this reason, production cost remains relatively high. Moreover, installation of the solenoid along with its mechanical arrangement requires undesirable large space which can compromise the compactness and low cost based facsimile system. Further, when the size and weight of the facsimile system are large, design options of the system are limited.

Figure 6:
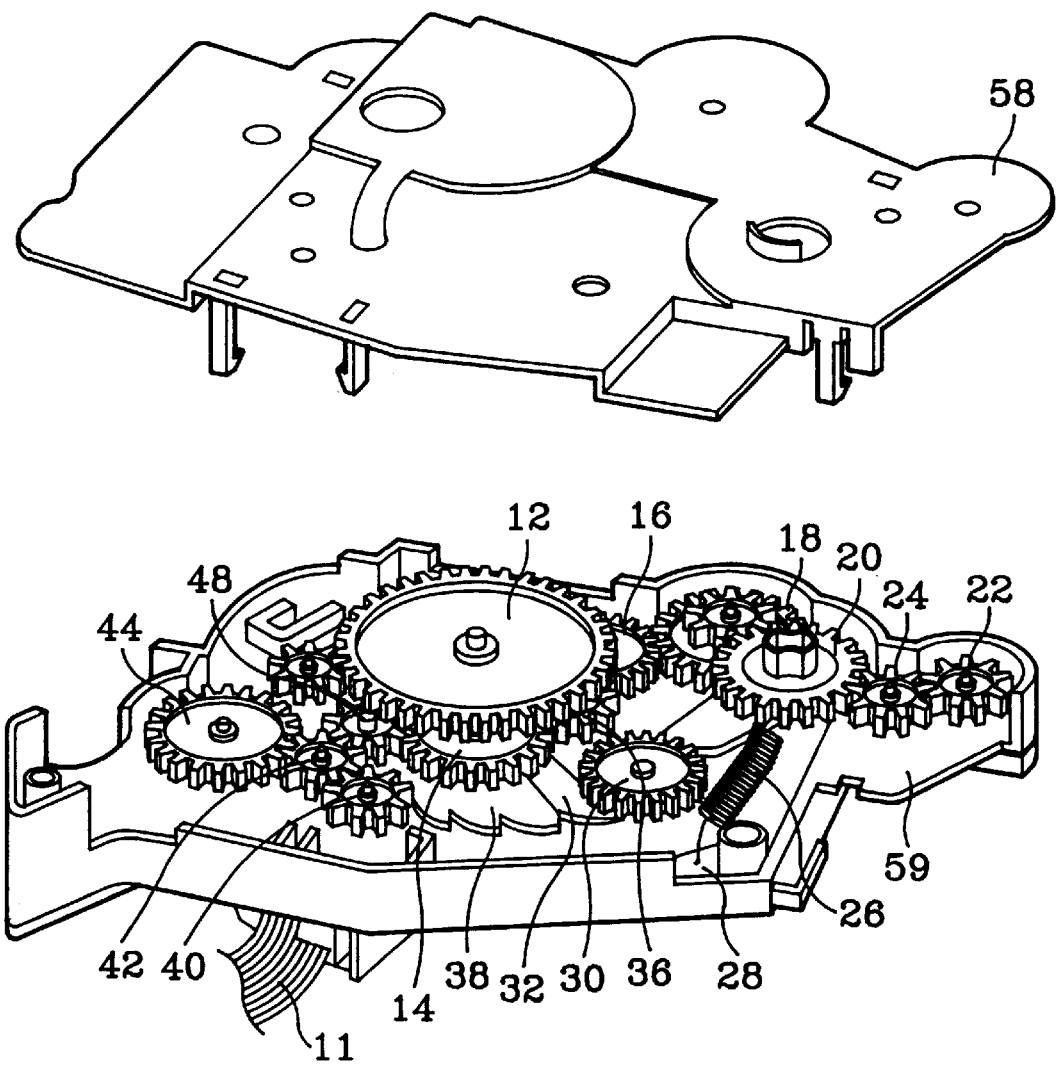
FIG. 6 illustrates a structure of an improved single motor driving device usable in a facsimile system constructed according to the principles of the present invention.

Turning now to FIG. 6 which illustrates a structure of an improved single motor driving device usable in a facsimile system as constructed according to the principles of the present invention. An exploded perspective view of this improved single motor driving device is shown in FIG. 7.

Figure 7:
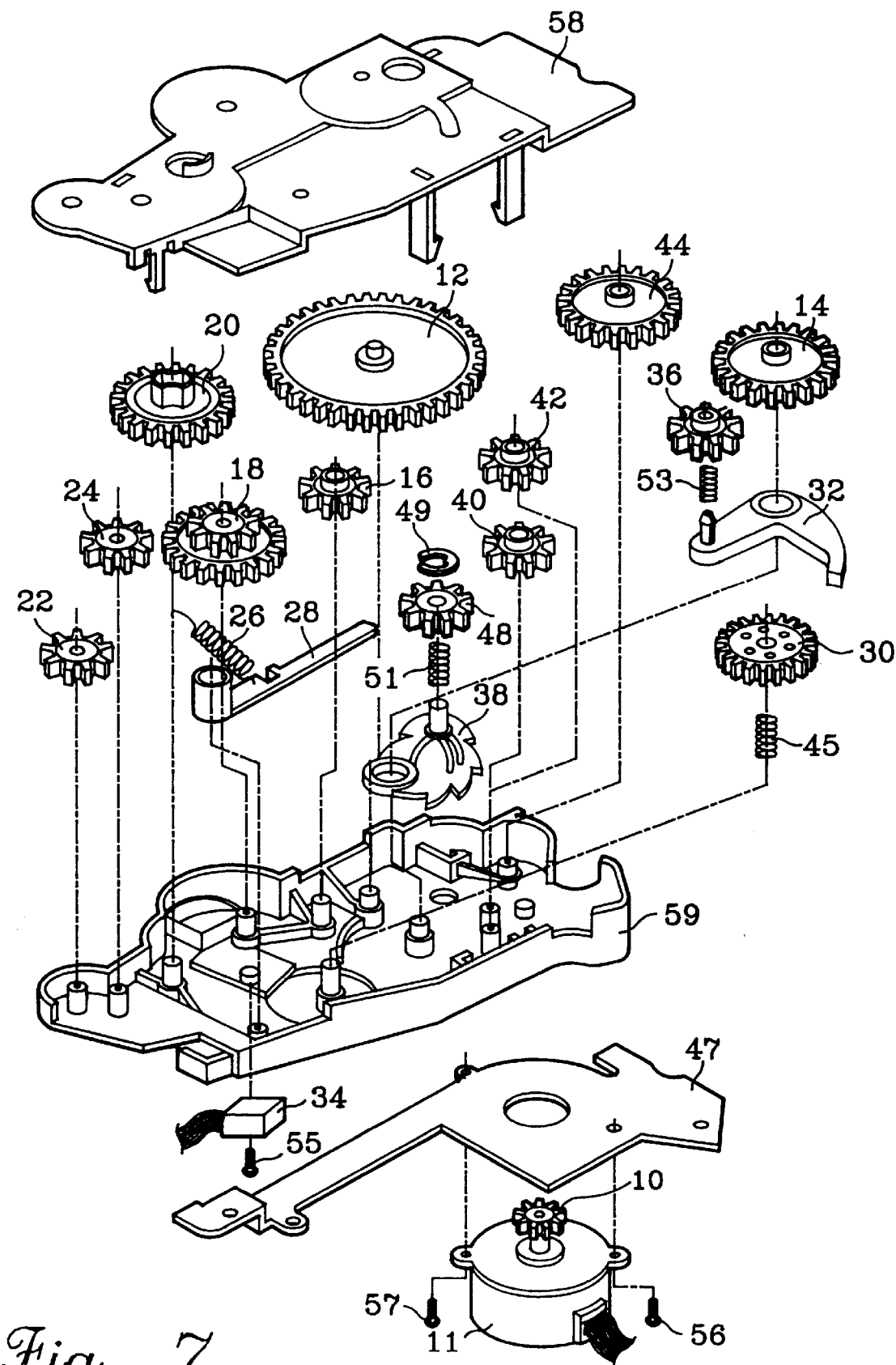
FIG. 7 is an exploded perspective view of the improved single motor driving device usable in a facsimile system constructed according to the principles of the present invention.

The single motor driving device constructed according to the principles of the present invention as shown in FIGS. 6 and 7 includes a drive gear 10 coupled to a single step motor 11 to rotate in response to a driving force of the step motor 11, and a first gear 12 of a double gear form which is engaged with the drive gear 10 to rotate in response to rotation of the drive gear 10. The first gear 12 engages with a center gear 14 at one side, and the center gear 14 engages with a first reciprocating gear 36 at one side thereof The center gear 14 and the first reciprocating gear 36 are pivotally connected to each other by a first link 32. At this time, the first reciprocating gear 36 is assembled with the first link 32 while compressing a compression coil spring 53. As a result, the first reciprocating gear 36 rotates in response to a surface pressure, together with a given frictional force. A second gear 16 is installed to one side of the first reciprocating gear 36, and engages with a third gear 18 of a double gear form at one side thereof The third gear 18 engages with an automatic feed roller (AFR) gear 20 of a single gear form at one side thereof, and the automatic feed roller (AFR) gear 20 engages with a first idler gear 24 at one side thereof The first idler gear 24 engages with a second idler gear 22 at one side thereof, and a cam gear 30 for changing a position of a push lever 28 is installed to the other side of the first reciprocating gear 36. A lever-spring 26 which is a tension coil spring is provided to one side of the lever 28 so as to allow the lever 28 to restore to an initial position after being pushed to an upper portion by the cam gear 30. A cam 50 for controlling the first link 32, a lever cam 52 for controlling the push lever 28 and a sensor cam 54 for controlling a sensor 34 are installed on one surface of the cam gear 30. The cam 50, lever cam 52 and sensor cam 54 are assembled in a unitary structure so as to rotate simultaneously with rotation of the cam gear 30, and a cam gear-spring 45 which is a compression coil spring is installed to a lower portion of the sensor cam 54, so that the cam gear 30 may rotate not by an unnecessary external force but by a given rotating force. In addition, the sensor 34 for setting position of transmission, copy, reception and reception back of the cam gear 30 is installed to the other surface of the cam gear 30 and at this time, the sensor 34 is latched to the frame 59 by a sensor fixing screw 55.

The center gear 14 engages with the second reciprocating gear 48 at the other side thereof, and the center gear 14 and the second reciprocating gear 48 are pivotally connected by the second link 38. Then, the second reciprocating gear 48 is assembled with the second link 38 while compressing a second reciprocating gear-spring 51 that is a compression coil spring at the lower surface thereof As a result, the second reciprocating gear 48 rotates in response to the surface pressure, together with the given frictional force. A pin 49 for preventing the second reciprocating gear 48 from escaping upon rotation is provided to the upper side of the second reciprocating gear 48. The second link 38 is formed in a ratchet whose teeth slope in one direction so as to catch and hold a lever 28 to prevent backward movement in order to perform the transmission, reception, copy and reception back functions of the facsimile system. A fourth gear 40 is provided to the one side of the second reciprocating gear 48, and engages with a fifth gear 42 at one side thereof The second reciprocating gear 48, the fourth gear 40 and the fifth gear 42 are each shifted gears having pointed tooth faces or by high tooth gears, in order to prevent their tooth faces from being contacted. Alternatively, the second reciprocating gear 48, the fourth gear 40 and the fifth gear 42 are swing gears. The fifth gear 42 engages with a sixth gear 44 of a double gear form at one side thereof, and a heat protection plate 47 is installed between the step motor 11 and the frame 59 in order to prevent heat of the step motor 11 from being transmitted to the frame 59. A cover 58 is provided with the device in order to prevent all the gears from being dislodged.

Figure 8:
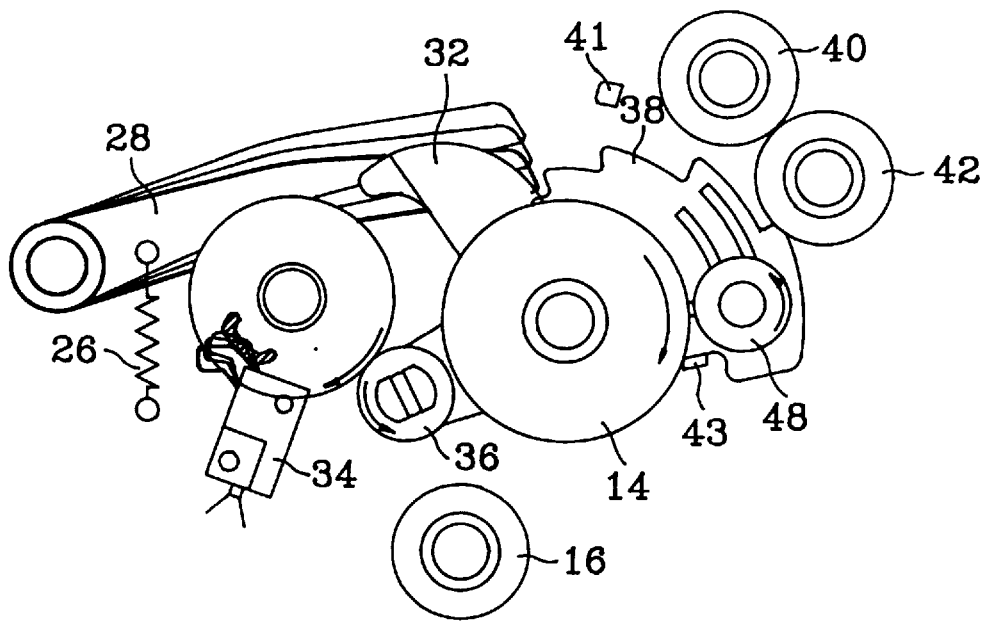
FIG. 8 is a schematic diagram illustrating rotation positioning and driving of a cam gear in an improved single motor driving device usable in a facsimile system according to the principles of the present invention.
Figure 9:
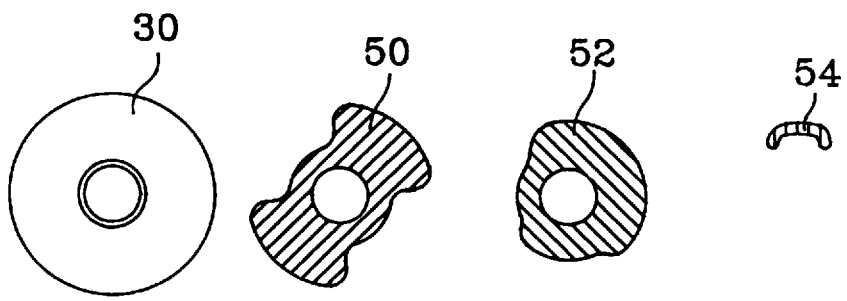
FIG. 9 is a exploded perspective view illustrating a structure of the cam gear in an improved single motor driving device usable in a facsimile system according to the principles of the present invention.
Figure 10:
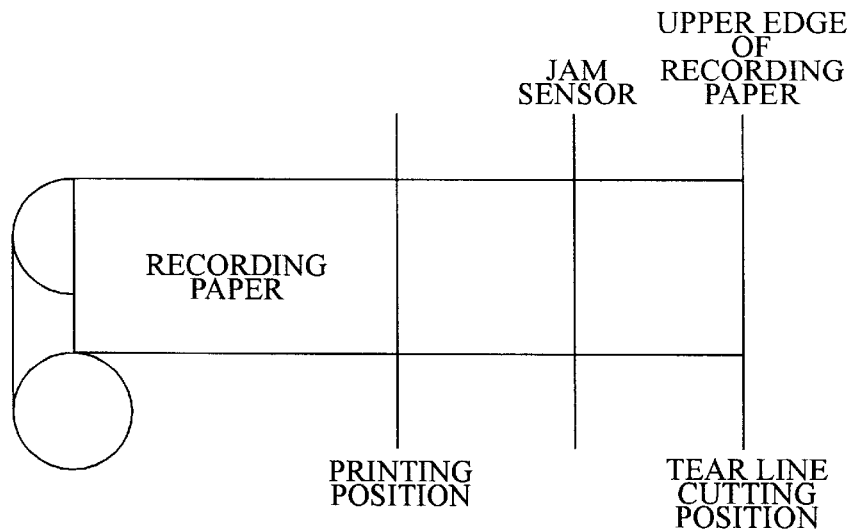
FIG. 10 is a perspective view illustrating the position of a recording paper after each printing operation when the facsimile system operates in one of a reception mode and a copying mode.

Refer now to FIG. 8 which is a perspective view illustrating how a cam gear 30 of the single motor driving device is driven to position the facsimile system for operation in one of a transmission mode, a reception mode, a copying mode and a reception back mode. FIG. 9 illustrates a structure of the cam gear 30 having a cam 50, a lever cam 52 and a sensor cam 54 mounted thereon for use to control operation in one of the transmission mode, the reception mode, the copying mode and the reception back mode. The reception back mode as contemplated by the present invention is referred to the internal operation of the facsimile system before printing images on a recording paper in which a recording paper is rolled back from a tear line cutting position back to a printing position for beginning printing images on a recording paper. The reception back mode is generally used to save paper and to check paper jam in the facsimile system. For example, FIG. 10 illustrates the position of a recording paper after each printing operation when the facsimile system operates in one of a reception mode and a copying mode. When a recording paper is conveyed to the tear line cutting position after a printing operation, the recording paper is cut by a tear line cutter. After each printing operation, the upper edge of recording paper remains at the tear line cutting position. The reception back mode is, therefore, used to convey or roll the recording paper back to the printing position for preparation of a next printing operation. When the recording paper is moved backward to the printing operation, a jam sensor which is typically installed between the printing position and the tear line cutting position checks for paper jam. Accordingly, the reception back mode is used both to save paper and to check for paper jam.

Figure 11:
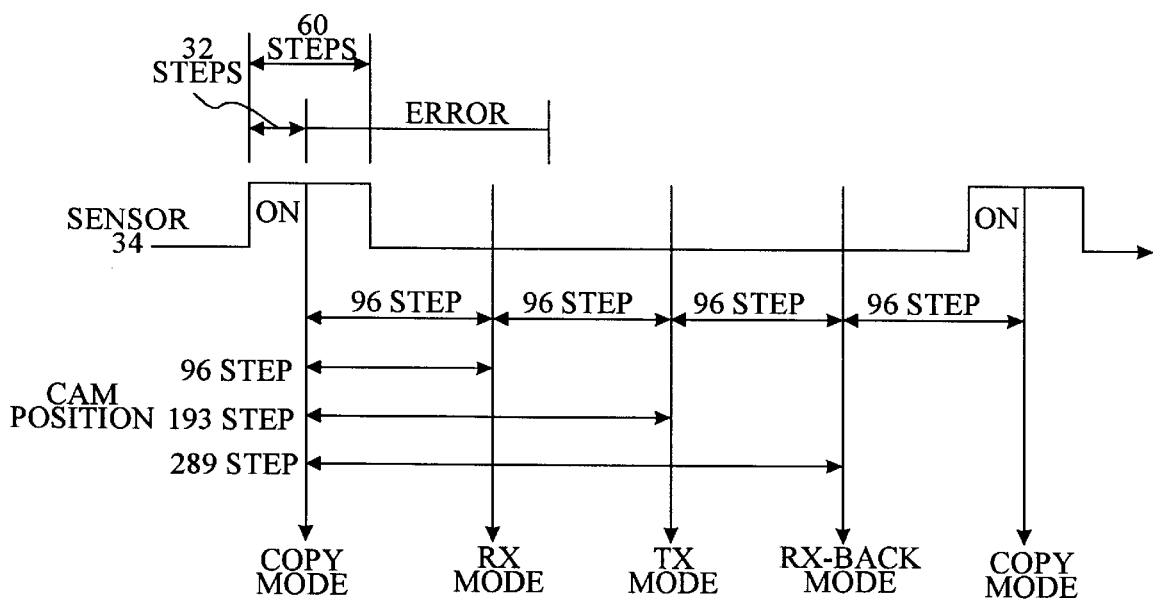
FIG. 11 is a rotational diagram of a single motor driving device constructed according to the principles of the present invention.

FIG. 11 is a rotational diagram of a single motor driving device constructed according to the principles of the present invention which operates in one of a transmission mode, a reception mode, a reception back mode and a copying mode. This rotational diagram and the operation of the single motor driving device usable in a facsimile system will be described hereinafter with reference to FIGS. 12, 14, 16 and 18 which respectively illustrate a process of controlling a step motor upon operation of one of a transmission mode, a reception mode, a copying mode and a reception back mode, and FIGS. 13, 15, 17 and 19 which illustrate the single motor driving device usable in a facsimile system in operation in one of the transmission mode, the reception mode, the copying mode and the reception back mode.

Figure 12:
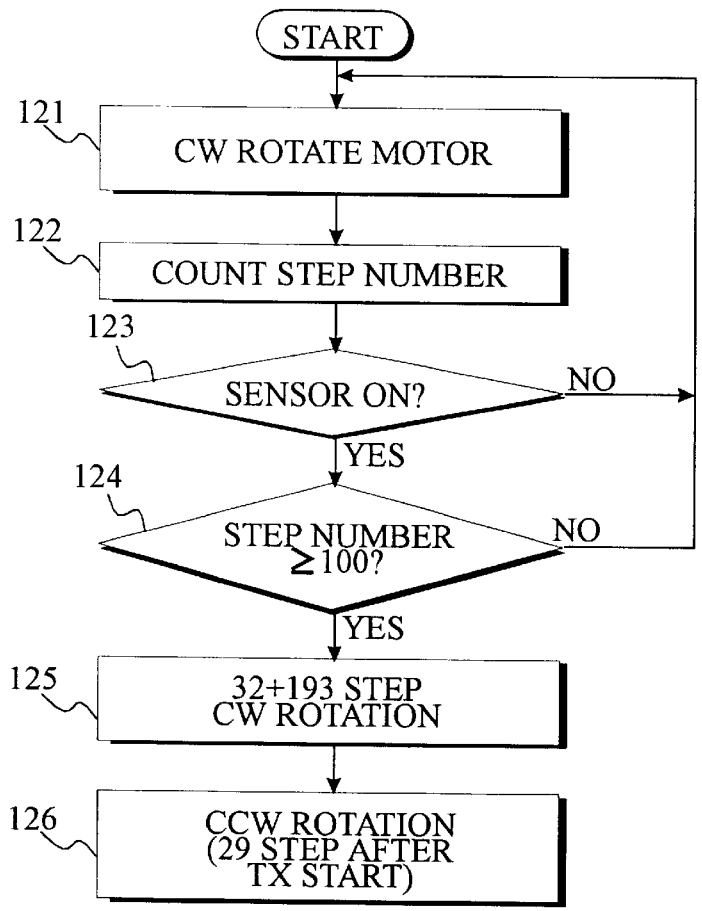
FIG. 12 is a flow chart illustrating a process of setting a single motor driving device usable in a facsimile system in a transmission mode.

FIG. 12 illustrates a process of controlling a step motor 11 upon an initial operation of a transmission mode. First, in step 121, a control unit (not shown) rotates the step motor 11 in a clockwise direction. The control unit begins to count the step number of the motor 11 from an initial constant reference value such as zero at step 122.

Next, the control unit determines whether the position of the sensor cam 54 mounted on the cam gear 30 as shown in FIG. 8 is sensed by the sensor 34 at step 123. If the position of the sensor cam 54 is sensed by the sensor 34, this means that the step motor 11 rotates in a clockwise direction by one step. When the control unit determines that the position of the sensor cam 54 is sensed by the sensor 34 at step 123, the control unit determines whether the clockwise rotational step number of the step motor 11 reaches a set rotational value of, for example, 100 for initial positioning of a sensor 34 at step 124. If the rotational step number has not reached 100, the control unit continues to rotate the step motor and count the step number until the rotational step number reaches 100 via steps 121 to 124. After that, the control unit further rotates the step motor 11 in a clockwise direction by 225 =(32+193) steps as shown in FIG. 11 at step 105, and at step 106, rotates in a counterclockwise direction by 29 steps so as to set the single motor driving device in an initial transmission mode state. After that, the transmission operation is performed in response to input of an original document.

Figure 13:
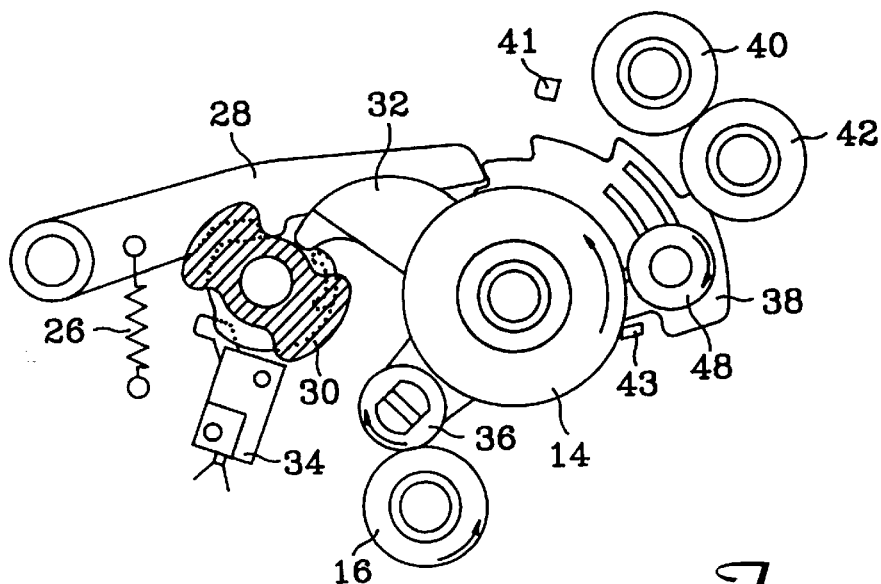
FIG. 13 is a schematic diagram of a single motor driving device usable in a facsimile system which operates in a transmission mode according to the principles of the present invention.

FIG. 13 illustrates a single motor driving device usable in a facsimile system which operates in a transmission mode according to the principles of the present invention. When the single motor driving device as shown in FIG. 8 is set in an initial transmission mode state, the drive gear 10 rotates in a clockwise direction in response to a driving force of the step motor 11. The first gear 12 rotates in a counterclockwise direction in response to rotation of the drive gear 10. The center gear 14 which is engaged with the first gear 12 rotates in a clockwise direction in response to rotation of the first gear 12 as shown in FIG. 8. At this time, the first reciprocating gear 36 rotates in a clockwise direction and then engages with the cam gear 30. Simultaneously with this, the first reciprocating gear 36 stops further rotation and rotates in a counterclockwise direction, and then the cam gear 30 rotates in a clockwise direction by the first reciprocating gear 36. Along with this, the sensor cam 54 installed to one surface of the cam gear 30 rotates, and thereby the sensor 34 operates to sense the initial position of the cam gear 30 as shown in FIG. 8. After that, the sensor 34 is fixed at a position shown in FIG. 13. At this time, any further rotation of the second link 38 is deterred by the second stopper 43. As a result, the second link 38 is locked as shown in FIG. 8.

After that, the center gear 14 rotates in a counterclockwise direction as the drive gear 10 rotates in the counterclockwise direction, and the first reciprocating gear 36 rotates in a clockwise direction in response to rotation of the center gear 14 as shown in FIG. 13. The second gear 16 rotates in a counterclockwise direction in response to rotation of the first reciprocating gear 36, and the third gear 18 rotates in a clockwise direction in response to rotation of the second gear 16. The automatic feed roller (AFR) gear 20 which is engaged with the third gear 18 rotates in a counterclockwise direction by the third gear 18. The first idler gear 24 which is engaged with the automatic feed roller (AFR) gear 20 rotates in a clockwise direction which, in turn, allows the second idler gear 22 to rotate in a counterclockwise direction to turn a transmission roller gear in a clockwise direction so as to rotate a transmission roller mounted thereon. The transmission roller then transfers an original document into the facsimile system for completion of a transmission operation.

At this time, the lever 28 is in contact with one side surface of the second link 38 so that the second reciprocating gear is not in contact with the fourth and fifth gears 40 and 42. As a result, the sixth gear 44 does not operate, and therefore, the reception roller does not rotate while the transmission roller rotates during the transmission mode.

Figure 14:
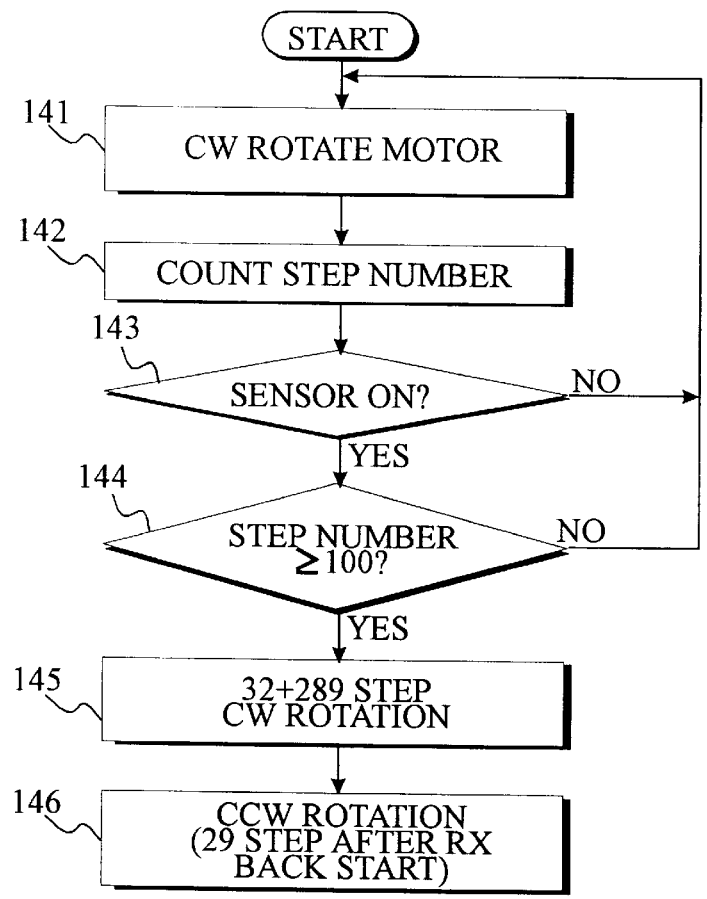
FIG. 14 is a flow chart illustrating a process of setting an improved single motor driving device in a reception back mode.

FIG. 14 illustrates a process of controlling the step motor 11 upon an initial operation of the reception back mode which is initiated to move a recording paper from a tear line cutting position back to a printing position for beginning printing images in response to operation of either a reception mode or a copying mode. First, in step 141, a control unit rotates the step motor 11 in a clockwise direction. The control unit begins to count the step number of the motor 11 from an initial reference value such as zero at step 142.

Next, the control unit determines whether the position of the sensor cam 54 is sensed by the sensor 34 in step 143. After the control unit determines that the position of the sensor cam 54 is sensed by the sensor 34 at step 143, the control unit determines whether a clockwise rotational step number of the step motor 11 reaches a set rotational value of, for example, 100 at step 144. If the rotational step number has not reached 100, the control unit continues to rotate the step motor 11 and count the step number until the rotational step number reaches 100 via steps 141 to 144. After that, the control unit further rotates the step motor 11 in a clockwise direction by 321=(32+289) steps as shown in FIG. 11 at step 145, and at step 146, rotates in a counterclockwise direction by 29 steps so as to set the single motor driving device in an initial reception back mode state.

Figure 15:
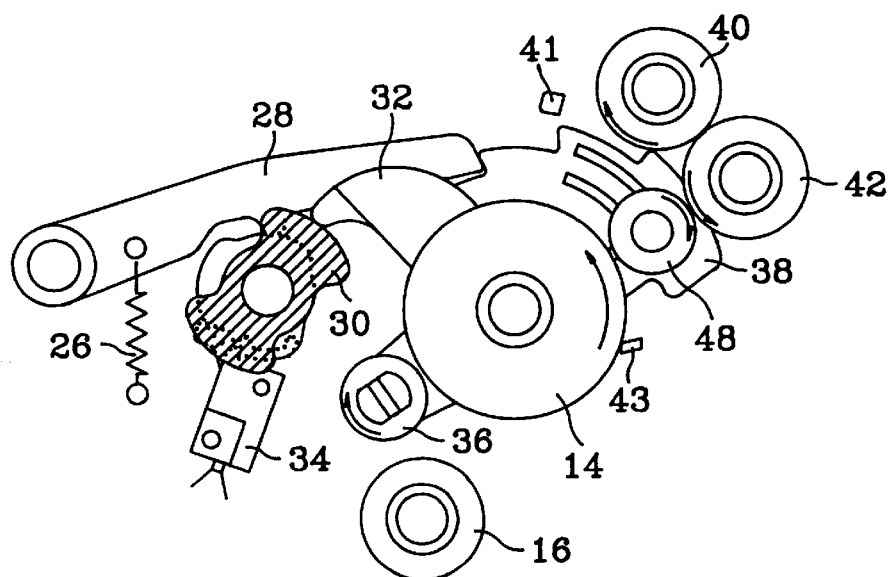
FIG. 15 is a schematic diagram of a single motor driving device usable in a facsimile system which operates in a reception back mode according to the principles of the present invention

FIG. 15 illustrates a single motor driving device usable in a facsimile system which operates in a reception back mode according to the principles of the present invention. When the single motor driving device as shown in FIG. 8 is set in an initial transmission mode state, the drive gear 10 rotates in a clockwise direction in response to driving force of the step motor 11. The first gear 12 which is engaged with the drive gear 10 rotates in a counterclockwise direction in response to the drive gear 10. The center gear 14 which is engaged with the first gear 12 rotates in a clockwise direction in response to rotation of the first gear 12 as shown in FIG. 8. At this time, the first reciprocating gear 36 rotates to move in a clockwise direction and then engages with the cam gear 30. Simultaneously with this, the first reciprocating gear 36 stops further rotation and then starts to rotate in a counterclockwise direction. The cam gear 30 which is engaged with the first reciprocating gear 36 rotates in a clockwise direction. Along with this, the sensor cam 54 installed to one side surface of the cam gear 30 rotates, and thereby the sensor 34 operates to sense the initial position of the cam gear 30 as shown in FIG. 15. After that, the sensor 34 is fixed in the position shown in FIG. 8.

Thereafter, the drive gear 10 rotates counterclockwise as shown in FIG. 8, and the second reciprocating gear 48 rotates to move counterclockwise by the lever 28 and the second link 38 according to the position of the cam gear 30 and then engages with the fifth gear 42. As the center gear 14 rotates counterclockwise, the second reciprocating gear 48 rotates clockwise, and then turns the fifth gear 42 counterclockwise. The fifth gear 42 turns the sixth gear 44 clockwise. The sixth gear 44 turns the reception roller gear therewith counterclockwise thereby, rotating the reception roller counterclockwise. Along with this, the recording paper is reversely transferred, and accordingly the reception back procedure is completed. At this time, the first reciprocating gear 36 controls the moving position of the first link 32 by means of the cam 50 as shown in FIG. 8 so that the first reciprocating gear 36 is not to be contacted with the second gear 16. Thereby, the second gear 16 stops any further rotation and accordingly, the reception back operation is completed.

Figure 16:
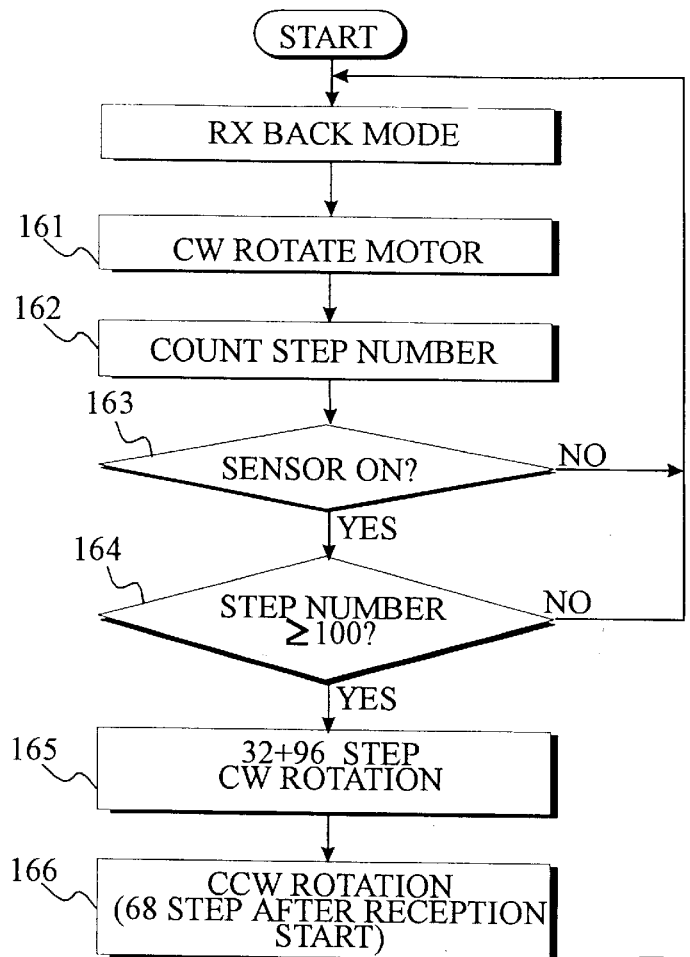
FIG. 16 is a flow chart illustrating a process of setting an improved single motor driving device usable in a facsimile system in a reception mode.

FIG. 16 illustrates a process of controlling a step motor 11 upon an initial operation of a reception mode. Since the reception mode requires printing images on a recording paper, the recording paper need to be conveyed backward from a tear line cutting position to a printing operation in a reception back mode. After the reception back mode is completed, a control unit rotates the step motor 11 in a clockwise direction at step 161. The control unit begins to count the step number of the motor 11 from an initial reference value such as zero at step 162.

Next, the control unit determines whether the position of the sensor cam 54 is sensed by the sensor 34 in step 163. After the control unit determines that the position of the sensor cam 54 is sensed by the sensor 34 at step 163, the control unit determines whether a clockwise rotational step number of the step motor 11 reaches a set rotational value of, for example, 100 at step 164. If the rotational step number has not reached 100, the control unit continues to rotate the step motor 11 and count the step number until the rotational step number reaches 100 via steps 161 to 164. After that, the control unit further rotates the step motor 11 in a clockwise direction by 128=(32+92) steps as shown in FIG. 11 at step 165, and at step 166, rotates in a counterclockwise direction by 68 steps so as to set the single motor driving device in an initial reception mode state. After that, the reception operation is performed in response to input of a recording paper.

Figure 17:
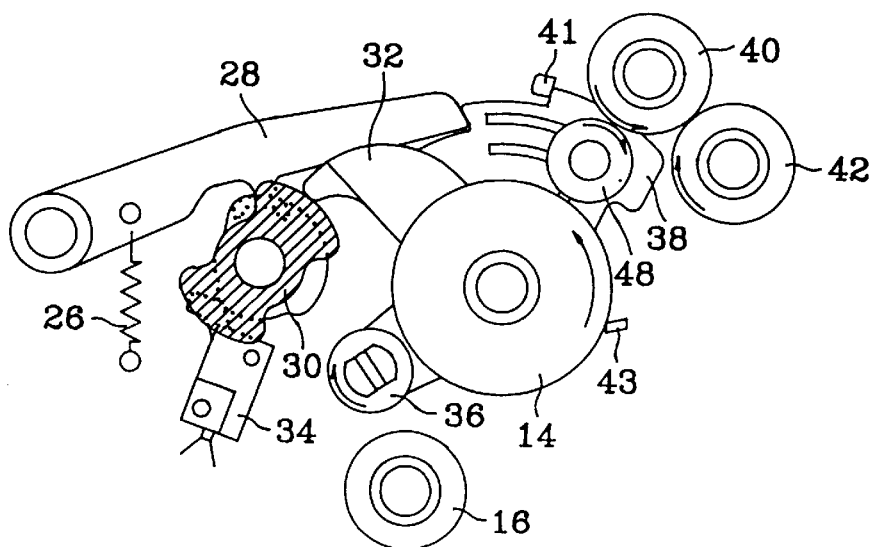
FIG. 17 is a schematic diagram of a single motor driving device usable in a facsimile system which operates in a reception mode according to the principles of the present invention.

FIG. 17 illustrates a single motor driving device usable in a facsimile system which operates in a reception mode according to the principles of the present invention. When the single motor driving device as shown in FIG. 8 is set in an initial transmission mode state, the drive gear 10 rotates in a clockwise direction in response to driving force of the step motor 11. The first gear 12 which is engaged with the drive gear 10 rotates in a counterclockwise direction in response to the drive gear 10. The center gear 14 which is engaged with the first gear 12 rotates in a clockwise direction in response to rotation of the first gear 12 as shown in FIG. 8. At this time, the first reciprocating gear 36 rotates in a clockwise direction, and then engages with the cam gear 30. Simultaneously with this, the first reciprocating gear 36 stops further rotation and then rotates counterclockwise, and the cam gear 30 rotates in a counterclockwise direction in response to rotation of the first reciprocating gear 36. Along with this, the sensor cam 54 installed to one side surface of the cam gear 30 rotates, and thereby the sensor 34 operates to sense the initial position of the cam gear 30 as shown in FIG. 8. After that, the sensor 34 is fixed to the position as shown in FIG. 17.

After that, the drive gear 10 rotates in a counterclockwise direction, and the second reciprocating gear 48 rotates in response to the lever 28 and the second link 38 according to the position of the cam gear 30, and then engages with the fourth gear 40. At this time, the second reciprocating gear 48 rotates in a clockwise direction as the center gear 14 rotates in a counterclockwise direction, and the second reciprocating gear 48 turns the fourth gear 40 in a counterclockwise direction. The fourth gear 40 turns the fifth gear 42 in a clockwise direction, and the fifth gear 42 turns the sixth gear 44 in a counterclockwise direction. The sixth gear 44 turns the reception roller gear engaging therewith clockwise, thereby rotating the reception roller. Along with this, the recording paper is transferred and accordingly, the reception operation is performed. At this time, the second link 38 is in contact with both the first stopper 41 and the lever 28 and therefore, the force generated when being contacted with the lever 28 can be reduced.

Then, the first link 32 controls the first reciprocating gear 36 by way of the cam 50 as shown in FIG. 17 so that the first reciprocating gear 36 is not in contact with the second gear 16. As a result, the second gear 16 does not operate, and therefore, the transmission roller does not rotate while the reception roller rotates during the reception mode.

Figure 18:
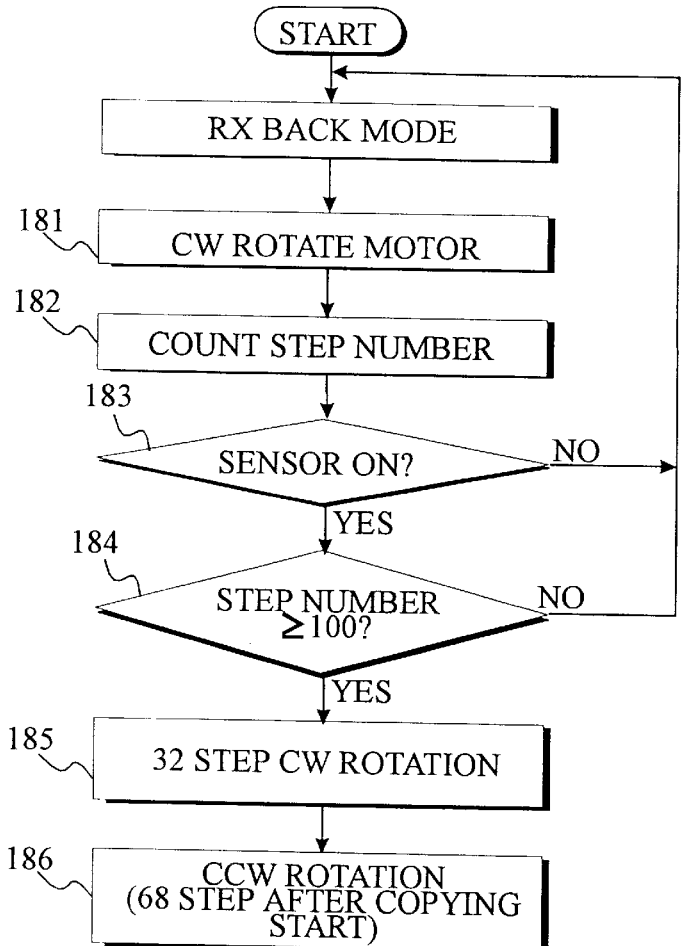
FIG. 18 is a flow chart illustrating a process of setting an improved single motor driving device in a copying mode.

FIG. 18 illustrates a process of controlling the step motor 11 upon an initial operation of a copying mode. The copying mode also requires printing images on a recording paper, the recording paper need to be conveyed backward from a tear line cutting position to a printing operation in a reception back mode. After the reception back mode is completed, a control unit rotates the step motor 11 in a clockwise direction at step 181. The control unit begins to count the step number of the motor 11 from an initial reference value such as zero at step 182.

Next, the control unit determines whether the position of the sensor cam 54 is sensed by the sensor 34 in step 183. After the control unit determines that the position of the sensor cam 54 is sensed by the sensor 34 at step 183, the control unit determines whether a clockwise rotational step number of the step motor 11 reaches a set rotational value of, for example, 100 at step 184. If the rotational step number has not reached 100, the control unit continues to rotate the step motor and count the step number until the rotational step number reaches 100 via steps 181 to 184. After that, the control unit further rotates the step motor 11 in a clockwise direction by 32 steps as shown in FIG. 11 at step 185, and at step 186, rotates in a counterclockwise direction by 68 steps so as to set the single motor driving device in an initial copying mode state. After that, the copying operation is performed in response to input of both an original and a recording paper.

Figure 19:
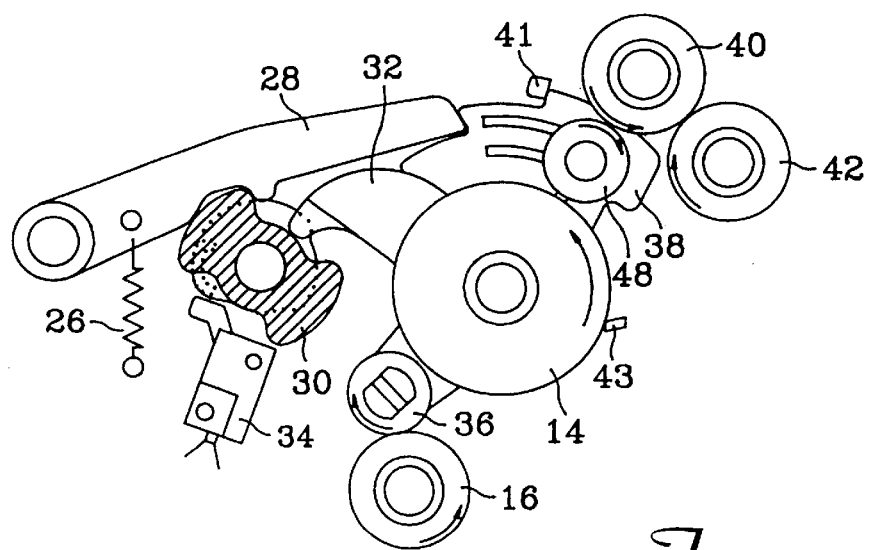
FIG. 19 is a schematic diagram of a single motor driving device usable in a facsimile system which operates in a copying mode according to the principles of the present invention.

FIG. 19 illustrates a single motor driving device usable in a facsimile system which operates in a copying mode according to the principles of the present invention. When the single motor driving device as shown in FIG. 8 is set in an initial transmission mode state, the drive gear 10 rotates in a clockwise direction in response to driving force of the step motor 11. The first gear 12 which is engaged with the drive gear 10 rotates in a counterclockwise direction in response to the drive gear 10. The center gear 14 which is engaged with the first gear 12 rotates in a clockwise direction in response to rotation of the first gear 12 as shown in FIG. 8. At this time, the first reciprocating gear 36 rotates in a clockwise direction and then engages with the cam gear 30. Simultaneously with this, the first reciprocating gear 36 stops further rotation and then starts to rotate in a counterclockwise direction. The cam gear 30 rotates in a clockwise direction in response to rotation of the first reciprocating gear 36 and along with this, the sensor cam 54 installed to one side surface of the cam gear 30 rotates, and thereby the sensor 34 operates to sense the initial position of the cam gear 30 as shown in FIG. 19. After that, the sensor 34 is fixed into the position shown in FIG. 19.

Thereafter, the center gear 14 rotates in a counterclockwise direction as the drive gear 10 rotates in a counterclockwise direction, and the first reciprocating gear 36 rotates in a clockwise direction in response to rotation of the center gear 14. The second gear 16 rotates in a counterclockwise direction by the first reciprocating gear 36, and the third gear 18 rotates in a clockwise direction by the second gear. The automatic feed roller gear 20 rotates in a counterclockwise direction in response to the third gear 18, and the first idler gear 24 rotates in a clockwise direction in response to rotation of the automatic feed roller gear 20. The second idler gear 22 rotates in a counterclockwise direction by the first idler gear 24, and then the second idler gear 22 turns the transmission roller gear engaging therewith clockwise, thereby rotating the transmission roller. Along with this, the original document to be transmitted is transferred. At this time, the drive gear 10 rotates in a counterclockwise direction as shown in FIG. 19, and the second reciprocating gear 48 rotates to move by the lever 28 and the second link 38 according to the position of the cam gear 30 and then engages with the fourth gear 40. As the center gear 14 rotates in a counterclockwise direction, the second reciprocating gear 48 rotates in a clockwise direction, and the second reciprocating gear 48 turns the fourth gear 40 in a counterclockwise direction. The fourth gear 40 turns the fifth gear 42 in a clockwise direction, and the fifth gear 42 turns the sixth gear 44 in a counterclockwise direction. Then, the sixth gear 44 turns the reception roller gear engaging therewith the clockwise, thereby rotating the reception roller. Along with this, the recording paper is transferred and accordingly, the copying operation is completed.

As described, the single motor driving device constructed according to the principles of the present invention is able to perform the transmission, reception, copy and reception back modes with only one motor. Therefore, productivity is improved due to the reduction in the assembly process. Furthermore, the transmission driving unit and the reception driving units are unified and therefore, the size and weight of the facsimile system are minimized which allows greater design options. In addition, the single motor driving device usable in a facsimile system can operate the transmission, reception, copy and reception back modes without the use of a solenoid and as a result, production cost is minimized.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A single motor driving device in a facsimile system, comprising:

a motor alternately rotatable in a first direction and a second and different direction;

a drive gear directly connected to said motor to rotate in one of said first direction and said second direction in response to a driving force of said motor;

a first gear rotatably engaged with said drive gear;

a center gear rotatably engaged with said first gear;

a first reciprocating gear pivotally connected to said center gear via a first link;

a second gear disposed adjacent to said first reciprocating gear, for transferring rotational power from said first reciprocating gear when said first reciprocating gear is engaged with said second gear;

a third gear rotatably engaged with said second gear;

an automatic feed roller gear rotatably engaged with said third gear;

a first idler gear rotatably engaged with said automatic feed roller gear;

a second idler gear rotatably engaged with said first idler gear;

a transmission roller gear rotatably engaged with said second idler gear, for transferring rotational power from said second idler gear to drive a transmission roller coaxially mounted thereon to feed an original document into the facsimile system;

a second reciprocating gear pivotally connected to said center gear via a second link;

fourth and fifth gears interlocked and disposed adjacent to said second reciprocating gear, for transferring rotational power from said second reciprocating gear when said second reciprocating gear is engaged with one of said fourth and said fifth gear;

a sixth gear rotatably engaged with said fifth gear, for transferring rotational power from said fifth gear to drive a reception roller gear having a reception roller coaxially mounted thereon to feed a recording paper into the facsimile system;

a lever positioned to regulate movement of said second link; and a cam gear disposed adjacent to said first reciprocating gear, for controlling movement of said first link and movement of said second link via said lever to begin operation of one of a transmission mode, a reception mode, a copying mode and a reception back mode.

2. The single motor driving device of claim 1, further comprised of said cam gear comprising:

a first cam mounted on said cam gear, for controlling movement of said first link to bring said first reciprocating gear in contact with said second gear during one of said transmission mode and said copying mode of operation;

a second cam mounted on said cam gear, for controlling position of said lever to bring said second reciprocating gear in contact with one of said fourth and said fifth gear during one of said reception mode, said copying mode and said reception back mode of operation; and a third cam mounted on said cam gear, for controlling position of a sensor for sensing whether said single motor driving device is in one of said transmission mode, said reception mode, said copying mode and said reception back mode.

3. The single motor driving device of claim 2, further comprised of said first cam, said second cam and said third cam being mounted on said cam gear in a unitary structure so as to rotate simultaneously with rotation of said cam gear.

4. The single motor drive device of claim 3, further comprising resilience means installed at a lower portion of said third cam for allowing said cam gear to rotate in response to a given rotational force.

5. The single motor drive device of claim 4, further comprised of said resilience means representing a compression coil spring.

6. The single motor driving device of claim 1, further comprising first resilience means installed a lower portion of said first reciprocating gear to absorb surface pressure and frictional force when said first reciprocating gear is assembled with said first link.

7. The single motor driving device of claim 6, further comprised of said first resilience means representing a compression coil spring.

8. The single motor driving device of claim 7, further comprising second resilience means installed a lower portion of said second reciprocating gear to absorb surface pressure and frictional force when said second reciprocating gear is assembled with said second link.

9. The single motor driving device of claim 8, wherein said second resilience means representing a compression coil spring.

10. The single motor driving device of claim 9, further comprising third resilience means installed at one side of said lever for allowing said lever to restore position after said lever is forced to move upward by said cam gear to accommodate different segments of said second link.

11. The single motor driving of claim 10, further comprised of said third resilience means representing a tension coil spring.

12. The single motor driving device of claim 1, further comprising a pin installed on an upper side of said second reciprocating gear for preventing said second reciprocating gear from dislodgement upon rotation.

13. The single motor driving device of claim 1, further comprised of said second link being formed by a ratchet having a plurality of teeth sloped in one direction as to catch and hold an end portion of said lever each time said lever is forced to move upward by said cam gear to position said second reciprocating gear is contact with one of said fourth and said fifth gear.

14. The single motor driving device of claim 1, further comprised of said second reciprocating gear corresponding to one of a shifted gear and a high tooth gear.

15. The single motor driving device of claim 1, further comprised of said second reciprocating gear corresponding to a swing gear.

16. The single motor drive device of claim 1, further comprised of said fourth gear corresponding to one of a shifted gear and a high tooth gear.

17. The single motor driving device of claim 1, further comprised of said fourth gear corresponding a swing gear.

18. The single motor drive device of claim 1, further comprised of said fifth gear corresponding to one of a shifted gear and a high tooth gear.

19. The single motor driving device of claim 1, further comprised of said fifth gear corresponding to a swing gear.

20. The single motor driving device of claim 1, further comprising:
   a frame for housing said drive gear, said center gear, said first and second reciprocating gears, said first and second links, said first to sixth gears, said automatic feed roller gear, said first and second idler gears, said transmission roller gear, said reception roller gear, said lever, and said cam gear; and
   a heat protection plate disposed outside of said frame for preventing generated from said motor from being transmitted inside said frame.

21. The single motor driving device of claim 20, further comprising a first stopper and a second stopper provided within said frame for limiting movement of said second link.

22. The single motor driving device of claim 1, further comprised said first reciprocating gear and said cam gear being mutually engaged according to a rotating direction of said center gear.

23. The single motor driving gear of claim 1, further comprised of said first reciprocating gear and said second gear being mutually engaged according to a rotating direction of said center gear.

24. The single motor driving gear of claim 1, further comprised of said second reciprocating gear and said fourth gear being mutually engaged according to a rotating direction of said center gear.

25. The single motor driving device of claim 1, further comprised of said second reciprocating gear and said fourth gear being mutually engaged according to a rotating direction of said center gear.

26. The single motor driving device of claim 1, further comprised of said third gear corresponding to a double gear form.

27. The single motor driving device of claim 1, further comprised of said sixth gear corresponding to a double gear form.

28. The single motor driving device of claim 1, further comprised of said first gear corresponding to a double gear form.

29. A single motor driving device in a facsimile system for operating in a transmission mode, comprising:
   a drive gear directly connected to a motor to alternately rotate in a first direction and in a second and opposite direction in response to a driving force of said motor;
   a first gear rotatably engaged with said drive gear;
   a center gear rotatably engaged with said first gear;
   a first reciprocating gear pivotally connected to said center gear via a first link;
   a second gear disposed adjacent to said first reciprocating gear, for transferring rotational power from said first reciprocating gear when said first reciprocating gear is in contact with said second gear,
   a third gear rotatably engaged with said second gear;
   an automatic feed roller gear rotatably engaged with said third gear;
   a first idler gear rotatably engaged with said automatic feed roller gear;
   a second idler gear rotatably engaged with said first idler gear;
   a transmission roller gear rotatably engaged with said second idler gear, for transferring rotational power from said second idler gear to drive a transmission roller coaxially mounted thereon to feed an original document into the facsimile system; and
   a cam gear disposed adjacent to said first reciprocating gear, for controlling movement of said first link to bring said first reciprocating gear in contact with said second gear for operation in said transmission mode.

30. A single motor driving device usable in a facsimile system for operating in a reception mode, comprising:
   a drive gear directly connected to a motor to alternately rotate in a first direction and in a second and opposite direction in response to a driving force of said motor;
   a first gear rotatably engaged with said drive gear;
   a center gear rotatably engaged with said first gear;
   a first reciprocating gear pivotally connected to said center gear via a first link;
   a second reciprocating gear pivotally connected to said center gear via a second link;
   second and third gears interlocked and disposed adjacent to said second reciprocating gear, for transferring rotational power from said second reciprocating gear when said second reciprocating gear is in contact with said second gear;
   a fourth gear rotatably engaged with said third gear, for transferring rotational power from said third gear to drive a reception roller gear having a reception roller coaxially mounted thereon to feed a recording paper into the facsimile system;

a lever positioned to lock said second link when said second reciprocating gear is in contact with said second gear; and a cam gear disposed adjacent to said first reciprocating gear, for controlling movement of said first link and movement of said second link via said lever for operation in said reception mode.

31. A single motor driving device usable in a facsimile system operable in a copying mode, comprising:

a drive gear directly connected to a motor to alternately rotate in a first direction and in a second and opposite direction in response to a driving force of said motor;

a first gear rotatably engaged with said drive gear;

a center gear rotatably engaged with said first gear;

a first reciprocating gear pivotally connected to said center gear via a first link;

a second reciprocating gear pivotally connected to said center gear via a second link;

a second gear disposed adjacent to said first reciprocating gear, for transferring rotational power from said first reciprocating gear when said first reciprocating gear is in contact with said second gear;

a third gear rotatably engaged with said second gear;

an automatic feed roller gear rotatably engaged with said third gear;

a first idler gear rotatably engaged with said automatic feed roller gear, a second idler gear rotatably engaged with said first idler gear;

a transmission roller gear rotatably engaged with said second idler gear, for transferring rotational power from said second idler gear to drive a transmission roller coaxially mounted thereon to feed an original document into the facsimile system;

fourth and fifth gears interlocked and disposed adjacent to said second reciprocating gear, for transferring rotational power from said second reciprocating gear when said second reciprocating gear is in contact with said fourth gear;

a sixth gear rotatably engaged with said fifth gear, for transferring rotational power from said fifth gear to drive a reception roller gear having a reception roller coaxially mounted thereon to feed a recording paper into the facsimile system;

a lever positioned to lock said second link when said second reciprocating gear is in contact with said fourth gear; and a cam gear disposed adjacent to said first reciprocating gear, for moving said first link to bring said first reciprocating gear in direct contact with said second gear, and for simultaneously forcing said lever to move upward to allow said second link to rotate to bring said second reciprocating gear in direct contact with said fourth gear for operation in said copying mode.

32. A single motor driving device usable in a facsimile system operable in a reception back mode, comprising:

a drive gear directly connected to a motor to alternately rotate in a first direction and in a second and different direction in response to a driving force of said motor;

a first gear rotatably engaged with said drive gear;

a center gear rotatably engaged with said first gear;

a first reciprocating gear pivotally connected to said center gear via a first link, a second reciprocating gear pivotally connected to said center gear via a second link;

second and third gears interlocked and disposed adjacent to said second reciprocating gear, for transferring rotational power from said second reciprocating gear when said second reciprocating gear is in contact with said third gear;

a fourth gear rotatably engaged with said third gear, for transferring rotational power from said third gear to drive a reception roller gear having a reception roller coaxially mounted thereon to feed a recording paper into the facsimile system;

a lever positioned to lock said second link when said second reciprocating gear is in contact with said third gear; and a cam gear disposed adjacent to said first reciprocating gear, for controlling movement of said first link and movement of said second link via said lever for operation in said reception back mode.

* * * * *